United States Patent [19]

Morgan

[11] 4,153,816
[45] May 8, 1979

[54] TIME ASSIGNMENT SPEECH INTERPOLATION COMMUNICATION SYSTEM WITH VARIABLE DELAYS

[75] Inventor: Willam A. Morgan, Longmont, Colo.

[73] Assignee: Storage Technology Corporation, Louisville, Colo.

[21] Appl. No.: 863,902

[22] Filed: Dec. 23, 1977

[51] Int. Cl.² .............................................. H04J 5/00
[52] U.S. Cl. .............................................. 179/15 AS
[58] Field of Search .......... 179/15 AS, 15 A, 15 BW, 179/15 BA, 15 BV, 15 AP, 15 BY, 1 SA

[56] References Cited

U.S. PATENT DOCUMENTS

| | | | |
|---|---|---|---|
| 3,644,680 | 2/1972 | Amano et al. | 179/15 AS |
| 3,836,719 | 9/1974 | Clark | 179/15 AS |
| 4,012,595 | 3/1977 | Ota | 179/15 AS |
| 4,048,447 | 9/1977 | Maruta | 179/15 AS |

Primary Examiner—Thomas A. Robinson
Attorney, Agent, or Firm—Woodcock, Washburn, Kurtz & Mackiewicz

[57] ABSTRACT

A time assignment speech interpolation system includes a variable length speech buffer for temporarily storing sampled signals until a transmission facility becomes available. Signals on input speech channels are converted into digital samples. If a transmission facility is available, the digital samples are reconstituted into analog signals which are transmitted over the facility. If no facility is available, digital samples are stored in a digital memory for a variable length of time until a transmission facility becomes available. Digital samples are retrieved from the memory in chronological order of their time of arrival at the memory. The variable length memory accommodates a short term overload of input signals to provide flexible buffering.

17 Claims, 8 Drawing Figures

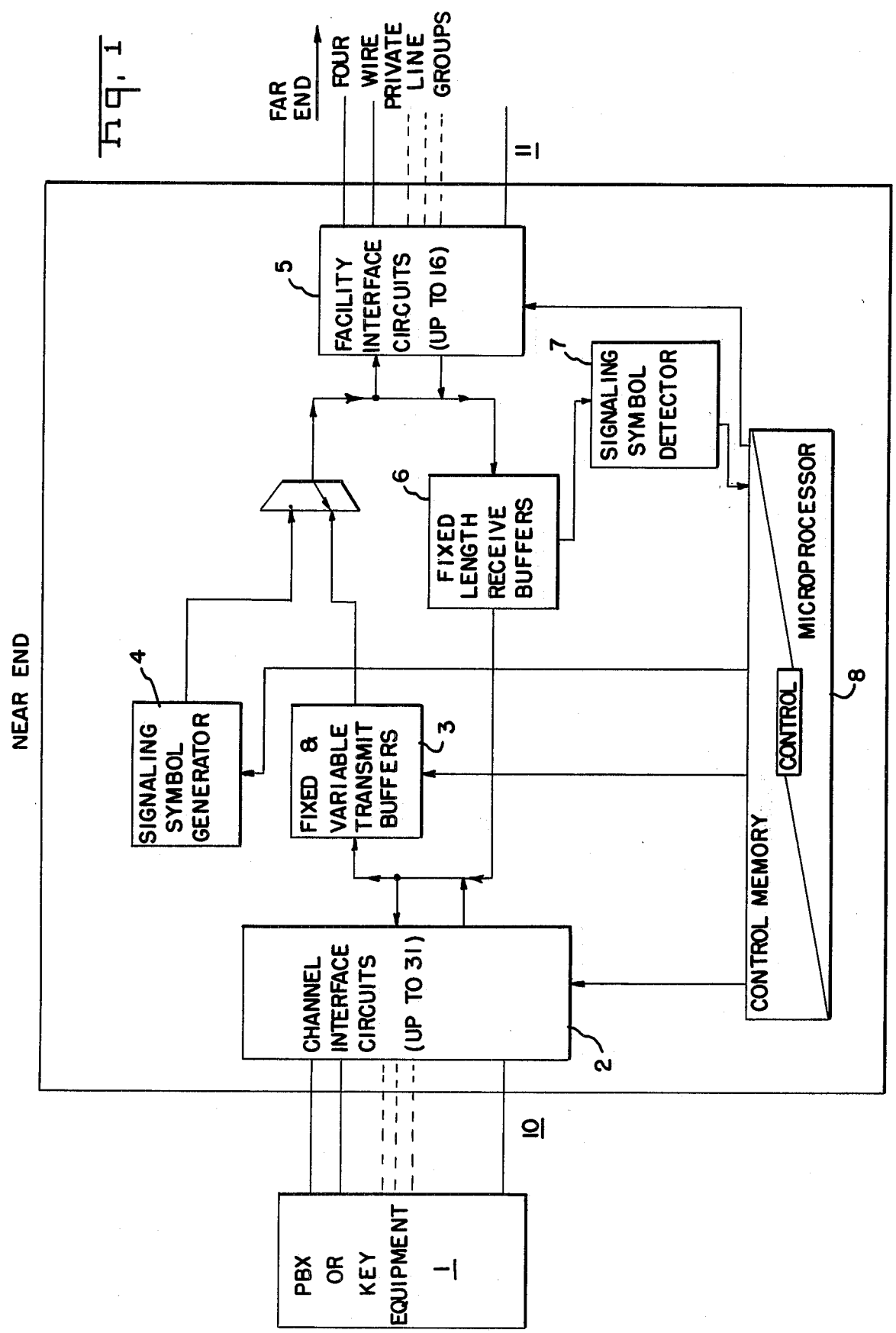

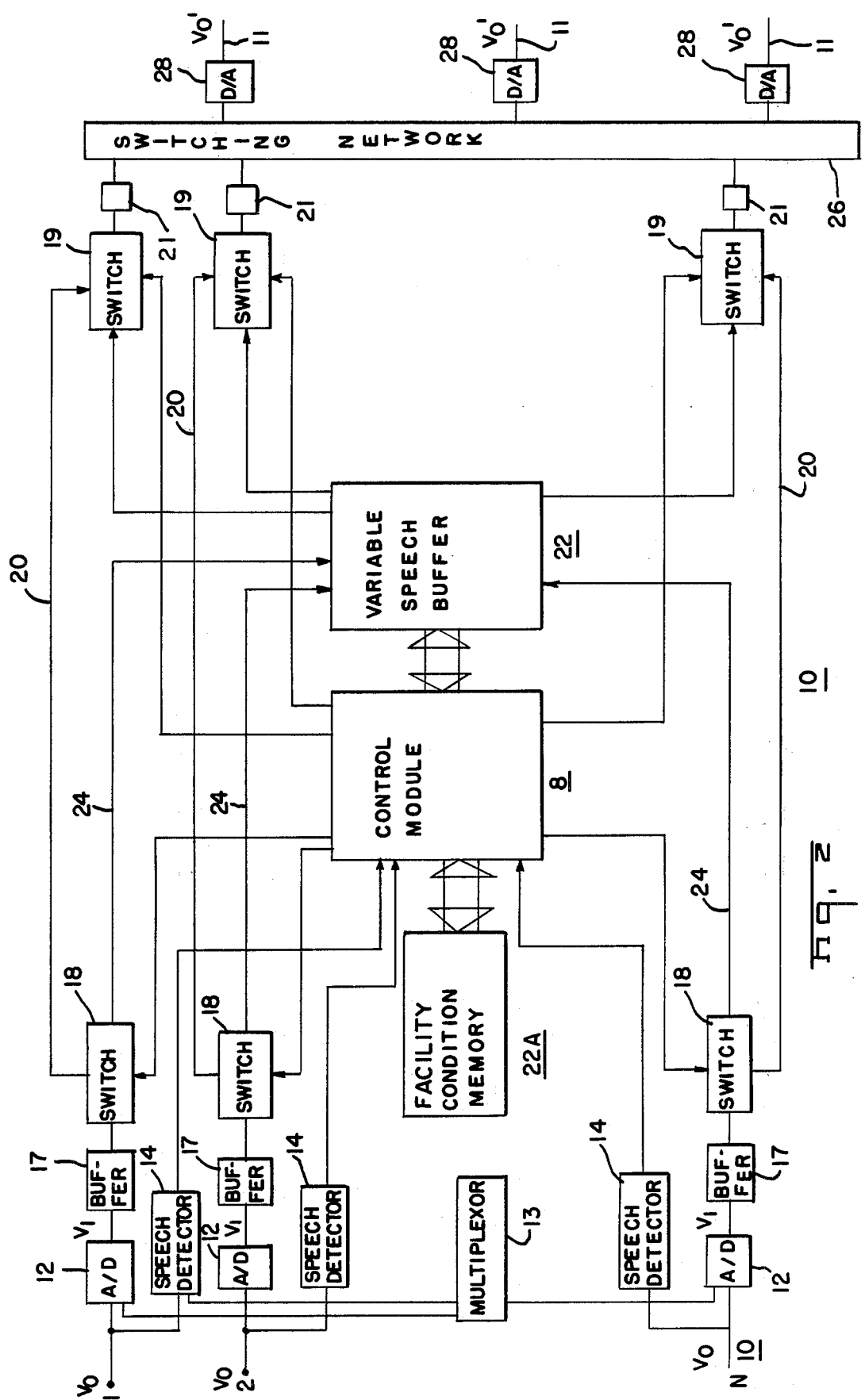

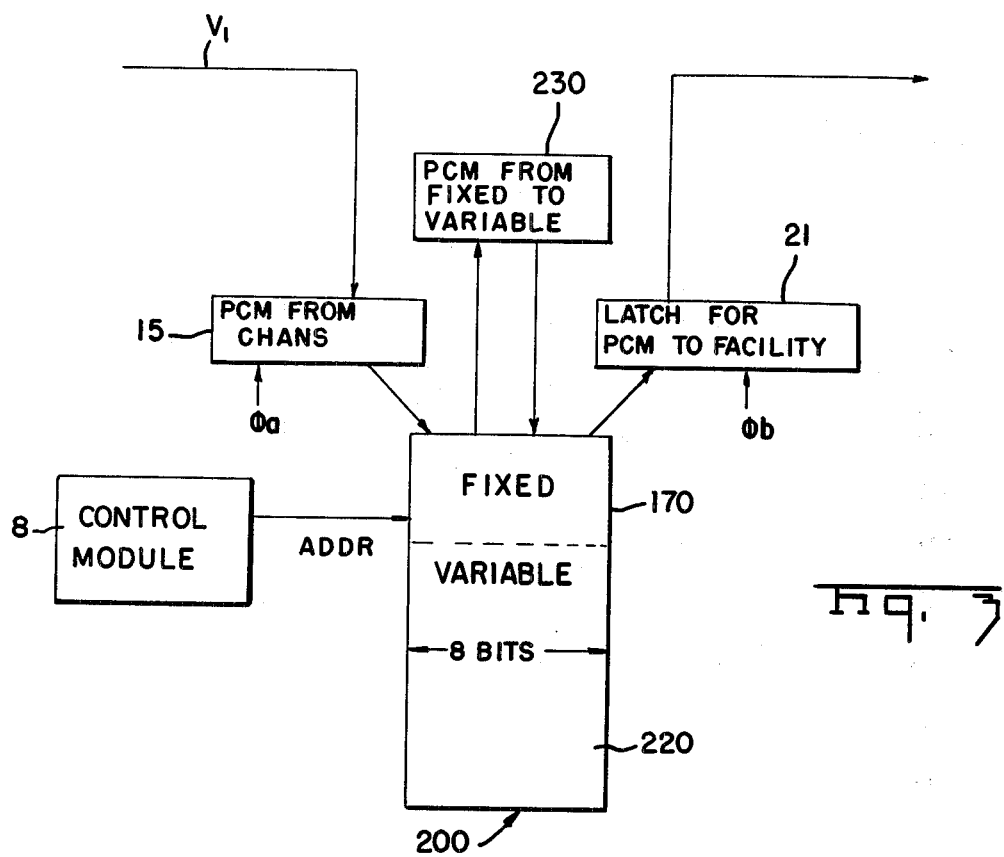
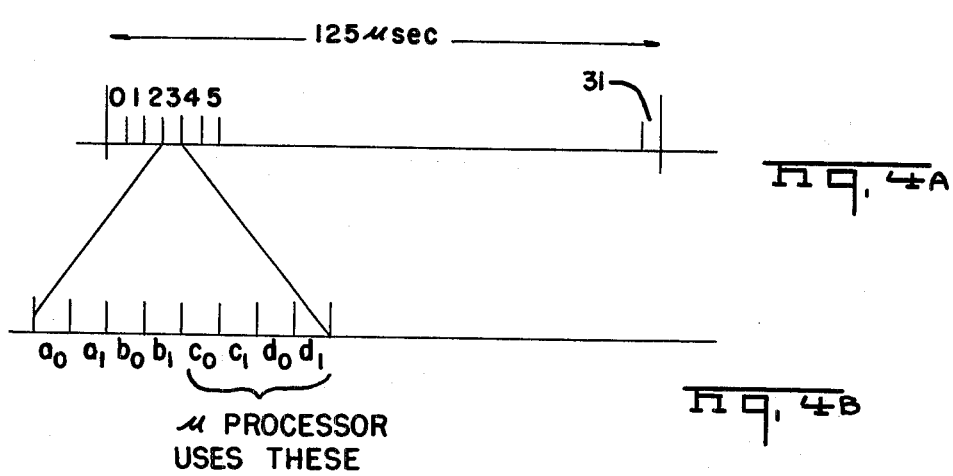

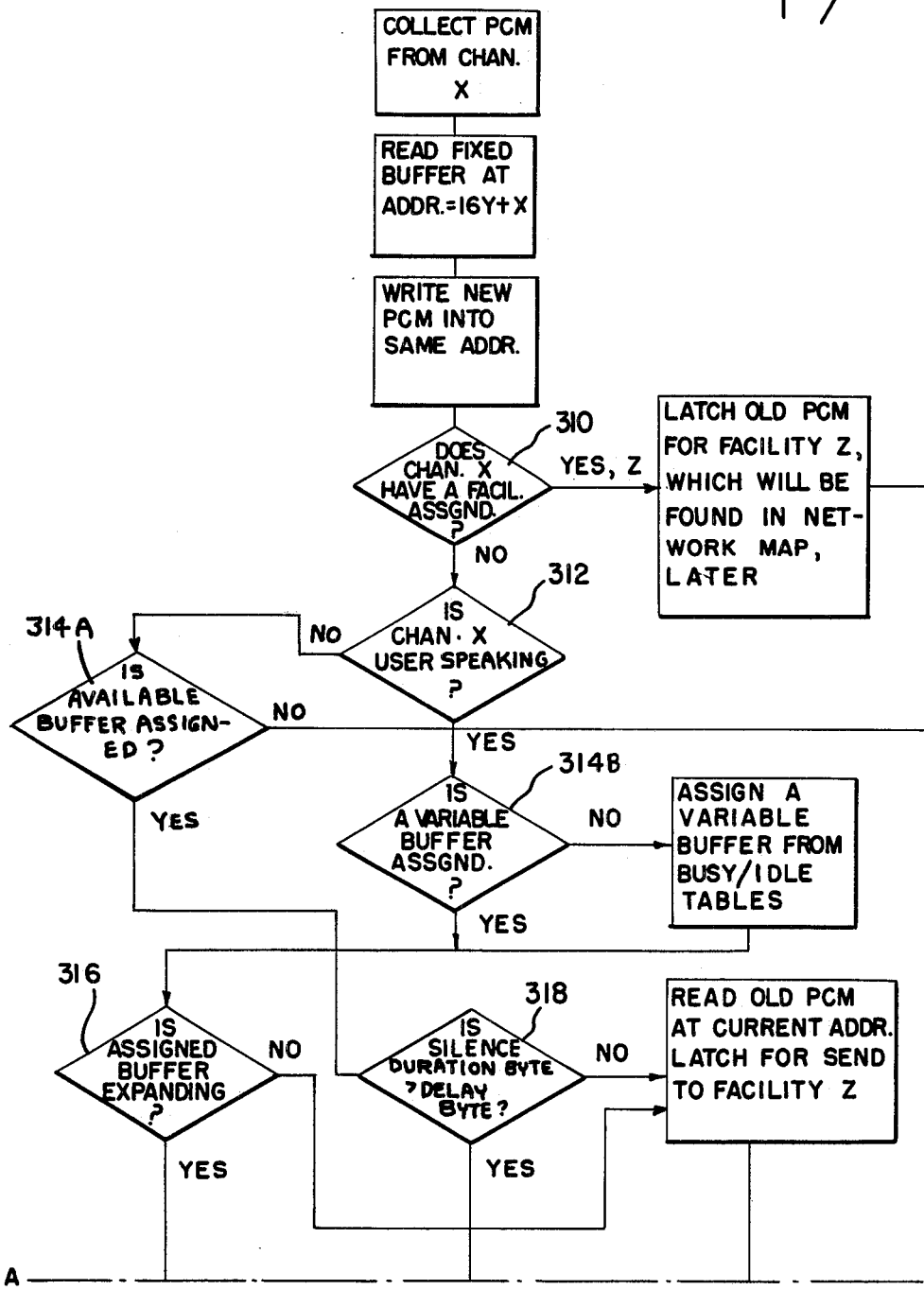

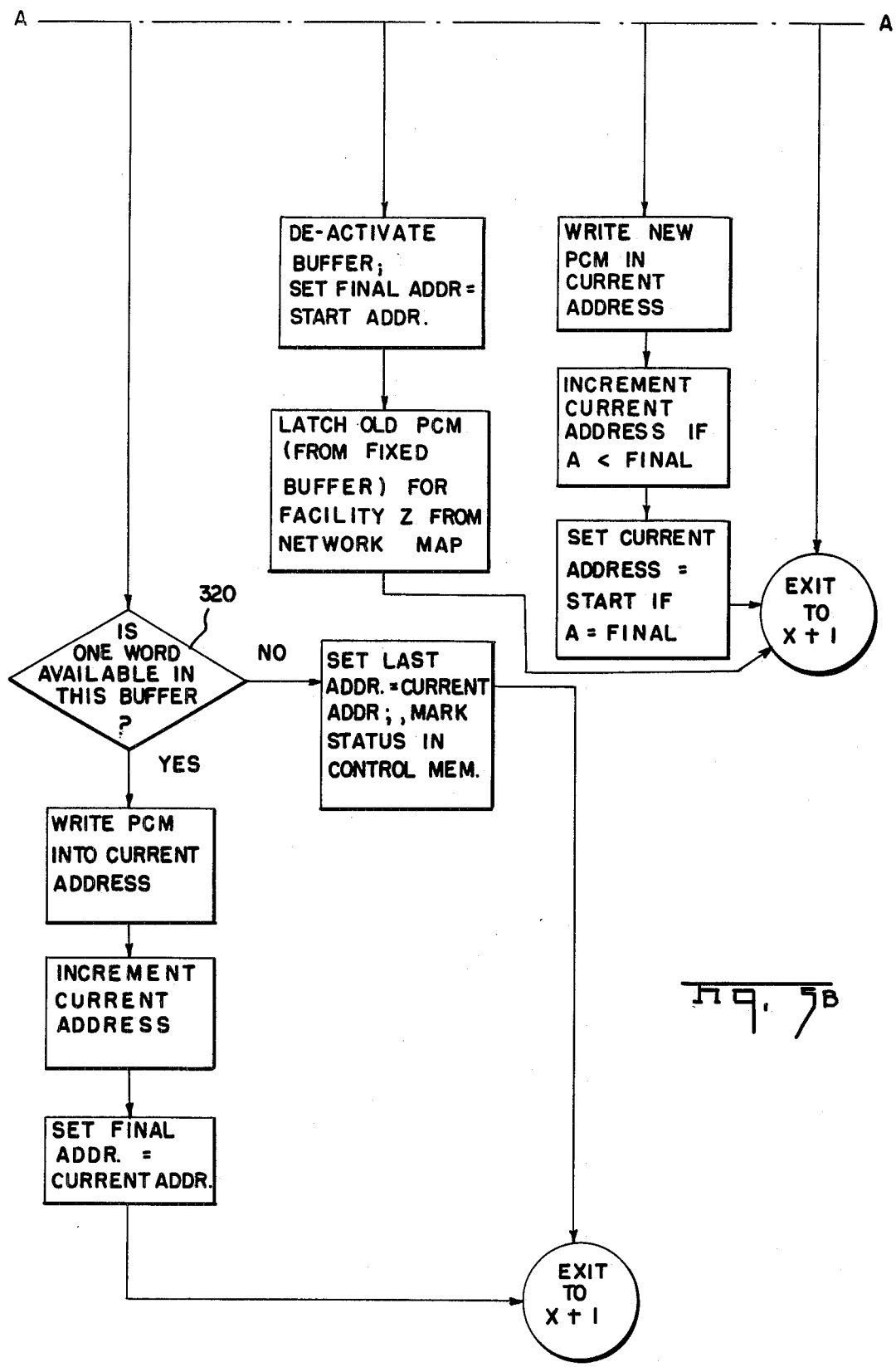

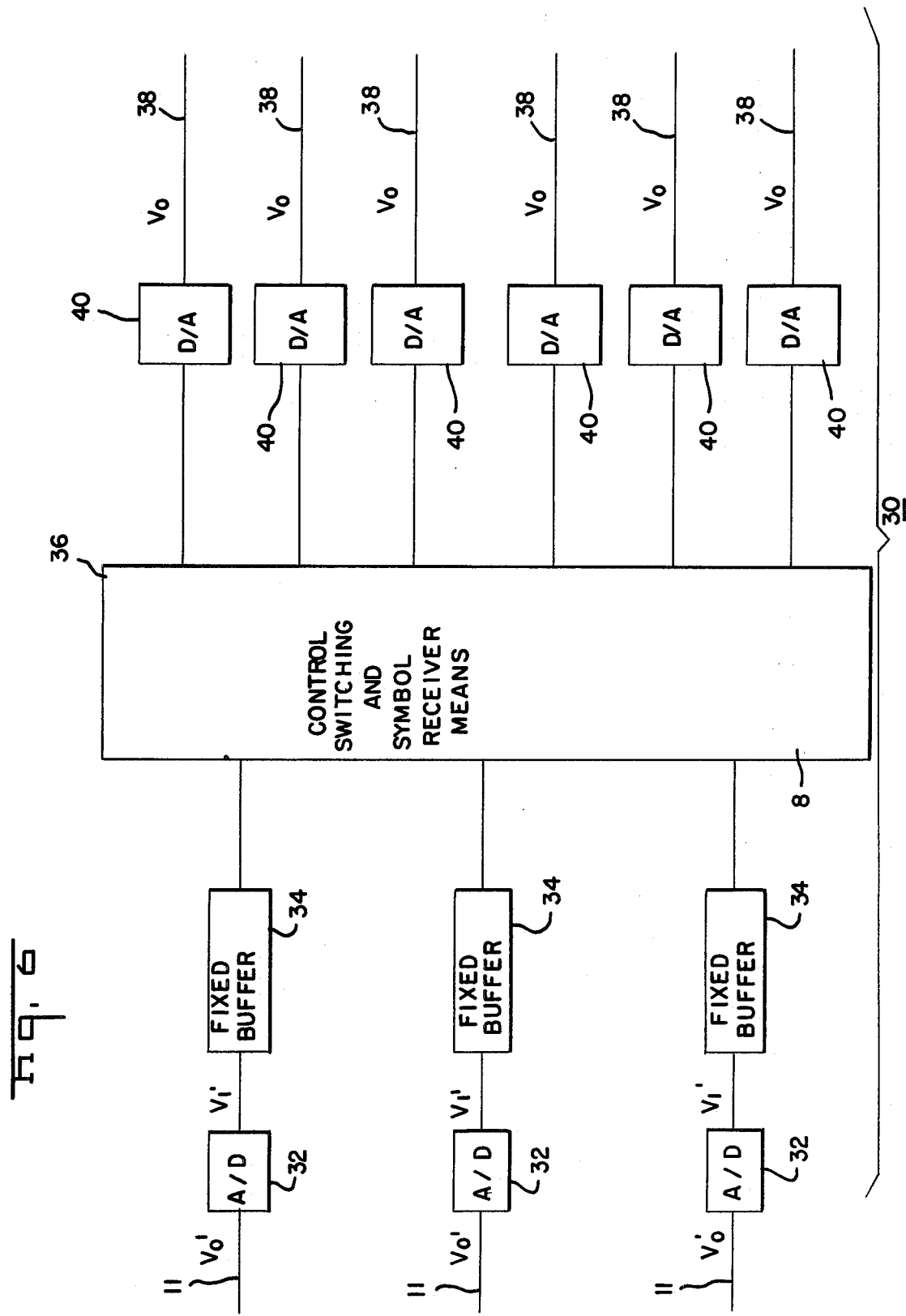

TIME ASSIGNMENT SPEECH INTERPOLATION COMMUNICATION SYSTEM WITH VARIABLE DELAYS

BACKGROUND OF THE INVENTION

This invention relates to communication systems and in particular it relates to communication systems which make more effective use of available telephone communications circuits than systems previously known to the prior art.

Because of the extremely high cost of certain telephone communications circuits, e.g., satellite circuits and undersea transmission links, the prior art has sought various means to maximize the efficiency of existing transmission circuits. One such system is known as a time assignment speech interpolation (TASI) system. In a typical TASI system, calls from N input channels are transmitted across, for example, N/2 transmission facilities to a remote location. At that location, the N/2 facilities are again applied to N output channels. TASI systems operate on the assumption, verified as a statistical fact, that at any given time not all channels will be in use. In fact, as a general rule, channels are actively in use less than half of the time. Accordingly, TASI systems may be defined as switching systems which interconnect sender and receiver only when the sender is active, provided there is a transmission facility available at that time.

One problem associated with prior art TASI systems has been the problem of freeze-out. Freeze-out is a problem of loss of speech, or other signal which may occur whenever the number of individuals talking or starting to talk in one direction exceeds the number of available transmission facilities. The larger the number of transmission facilities, the less likely will be the chance that a particular caller will not be assigned a transmission facility when he requests one. Therefore, an attempt to interpolate two independent conversations on a single channel would result in a large percentage of speech being lost, since the statistical probability of both talkers speaking at the same time would be high. However, with a large group of facilities serving an even larger group of channels, the variation in demand for transmission facilities is much smaller as a proportion of the total capacity, and freeze-out is diminished. Thus, known TASI systems may use for example 37 or more transmission facilities to lower the statistical probability of freeze-out.

It is desirable to apply the principles of time assignment speech interpolation to systems in which a smaller number of transmission facilities are available. For example, it might be desirable to apply the TASI principle to private line communication systems having as few as four transmission facilities.

In U.S. Pat. No. 4,012,595 to Ota, an attempt has been made to reduce the number of transmission facilities required in a digital transmission system. The system disclosed by Ota comprises an encoder for converting the original speech signals into a digital form and a digital speech memory for temporarily storing these speech signals in order of their occurrence. The speech is then retrieved from the speech memory and transmitted in digital form. The storage of the speech is very short term and is an incident of the switching method used to place speech samples into transmission times on the system.

One problem associated with the system disclosed in the aforementioned Ota patent is that the transmission of speech signals in digital form requires a relatively wide bandwidth, thus lowering the efficiency of the system. While the Ota system is claimed to be effective for use with as few as 15 transmission channels, it would be desirable to provide a system for use with private line telephone systems which may have, for example, as few as four transmission facilities.

Efforts have been made to reduce the memory capacity required in TASI systems. It is an object of U.S. Pat. No. 3,644,680 to Amano et al to keep the memory capacity in a TASI system at a minimum. Accordingly, Amano et al stores only those speech signals to which facility channels have been assigned. Amano therefore keeps memory capacity to a minimum but fails to address the problem of freeze-out.

Accordingly, it is an object of the present invention to provide a telephone communication system which may interconnect a relatively large number of callers to a large number of listeners through a relatively small number of transmission lines.

It is a further object of the present invention to provide a telephone communication system in which freeze-out is maintained at a minimum despite a relatively low number of transmission facilities.

RELATED APPLICATIONS

"FIXED SPEECH BUFFER MEMORIES FOR SIGNALLING WITHOUT AN ORDER WIRE", Cannon et al, Ser. No. 863,890, filed Dec. 23, 1977 describes the fixed delay which is provided in a TASI system of the type under consideration.

DIGITAL MEMORY PROVIDING FIXED AND VARIABLE DELAYS IN A TASI SYSTEM, Clingenpeel, Ser. No. 863,903, filed Dec. 23, 1977 describes the digital memory which implements both the fixed and variable delays.

The disclosure of these applications are incorporated herein by reference.

SUMMARY OF THE INVENTION

In accordance with this invention, a time assignment speech interpolation system is operated with a small number of transmission facilities without freeze-out by storing sampled input signals for variable times until a transmission facility becomes available.

More particularly, the communication system of this invention has sampling means which provides a digital representation of an incoming signal. If no transmission channels are available, this sampled signal is stored in a speech memory until an available transmission channel can be found. When an available transmission channel is located, the stored, sampled signal is retrieved from memory by a control means and, in one embodiment, reconstituted to an analog signal. This reconstituted signal is then transmitted to a remote location. The system is advantageous in that since transmission of the reconstituted voice signal is accomplished in analog form, bandwidth economy is achieved.

Another feature of the present invention lies in a means of bypassing the above-mentioned speech memory when a transmission facility is available and when no previously occurring speech signals have been stored. The provision of this bypassing means allows for transmission of signals in real time unless a freeze-out situation is encountered.

BRIEF DESCRIPTION OF THE DRAWINGS

The present invention will be more fully understood by reference to the accompanying drawings in which:

FIG. 1 is a block diagram of one terminal of the overall system of this invention;

FIG. 2 is a block diagram illustrating the transmitter portion of one terminal of the telephone communication system shown in FIG. 1;

FIG. 3 is a block diagram of one embodiment of the fixed and variable buffer shown in FIG. 1;

FIGS. 4A and 4B are diagrams illustrating the time sequence used in one embodiment of the present invention;

FIGS. 5A and 5B are flow diagrams illustrating the operation of the control means of FIG. 2; and FIG. 6 is a block diagram illustrating the receiver portion of a telephone communication system in accordance with the present invention.

DETAILED DESCRIPTION OF A PROPOSED EMBODIMENT

FIG. 1 is a block diagram of one end (i.e., terminal) of the overall system to which the present invention is applicable. Subscriber equipment 1, such as PBX or key equipment, is serviced by a private line communication system which includes four-wire transmission facilities 11. The subscriber equipment is connected over input channels 10 to the system of which this invention is a part. The N input channels will normally be serviced by approximately N/2 transmission facilities. Typically, up to thirty-one input channels will be serviced by up to sixteen transmission facilities.

Channel interface circuits 2 include analog-to-digital converters and a time division switching network for periodically polling each of the input channels to service them in sequence. Fixed and variable transmit buffers 3 are provided. In accordance with this invention, the variable buffers provide temporary storage for the sampled signals if a facility is unavailable. A symbol generator 4 generates a tone symbol which is inserted before each speech burst transmitted on a facility to indicate the channel which originated that speech burst, if the speech burst uses a facility not already assigned to the channel. Fixed buffer 3 provides a time interval in which to transmit the tone symbol without clipping the input signal.

Speech bursts are connected through interface circuits 5 to the transmission facilities 11. Interface circuits 5 include a time division, digital switching network and in one embodiment, digital-to-analog converters. The output of these digital-to-analog converters is an analog signal and this analog signal is transmitted from a location sometimes referred to as the "near end" across the facilities to a remote location sometimes referred to as the "far end."

When messages are received from the remote location, the fixed length receive buffers 6 provide a time interval in which the symbol detector 7 decodes the tone symbol to determine to which channel 10 the message should be assigned. The assignment of channels to facilities and the time that a message may be stored in the variable speech buffer is under control of control means 8, typically a microprocessor.

Referring now to FIG. 2, the transmitter portion of the communication system of the present invention is shown more particularly.

Original signals $V_0$ are applied to the plurality of input channels 1, 2 ... N from the equipment of the subscriber for transmission across a lesser plurality (e.g. N/2) of transmission facilities to a remote location where they are received by the receiver circuit shown in FIG. 6. The transmission facilities are denoted 11. The number N/2 of facility channels may be as high as sixteen; however, one of the advantages of the present invention is that the number of facility channels N/2 may be much lower than this, e.g., four without the aforementioned problem of excessive freeze-out.

In order to transmit signals arriving from N input channels across the N/2 (approximate) facilities, each of the input channels 1, 2 ... N are connected to the channel interface circuit 2 which is comprised of a plurality of sampling means such as the analog-to-digital converters 12 which are sequentially enabled by a multiplexer 13. Preferably, the converters 12 are COder-DECoder (CODEC) devices which produce pulse code modulated (PCM) samples. Each of the sampling means 12 produces a digitally coded signal $V_1$ which is a digital representation of the original analog signal $V_0$. The input lines 1, 2 ... N are also each applied to a speech detector 14 as shown. The speech detectors 14 are responsive to the presence of an original signal $V_0$ on an input channel and are capable of distinguishing speech from most noise for that signal. The output of each speech detector 14 is connected to a control means 8, which is preferably a microprocessor. The control means 8, similar to other known TASI systems, assigns one of the transmission facilities 11 to a particular input channel if a transmission facility 11 is available. Accordingly, a facility condition memory 22A is polled to determine which transmission facility is available, if any. Control means 8 can be a commercially available microprocessor such as an Intel 8085A.

Each of the sampled signals $V_1$ is applied to a fixed time delay means 17 such as a fixed transmit buffer means, the function of which is more fully described in the aforementioned Cannon et al application. When the sampled signals $V_1$ emerge from the delay means 17, each of the samples are applied to a switching means 18, the position of which is directed by the control means 8. The control means 8 also directs the condition of an additional switch means 19. The pair of switching means 18 and 19 are interconnected by a lead line or bypass path 20. In the event that the facility condition memory 22A indicates a status of an available transmission facility 11 when polled by the control means 8, the sampled signal $V_1$ is directed toward that transmission facility via bypass path 20 by the action of the switching means 18 and 19. Together, the switching means 18 and 19 as well as lead line 20 provide a means for bypassing the variable speech buffer 22.

The switching means 18 are also interconnected with the variable length speech buffer 22 by lines 24. In the event that the facility condition memory 22A indicates that none of the transmission facilities 11 are available when polled by the control means 8, the control means 8 activates switch 18 and directs the coded signal $V_1$ towards the speech buffer 22 where the coded signal is temporarily stored until a transmission channel becomes available. The coded voice signals $V_1$, including brief periods of silence, are stored in the speech buffer 22 in the order of their occurrence. Further, all coded voice signals $V_1$ emanating from a particular input channel are stored in the same location within the buffer 22. When a transmission facility 11 does become available these stored signals are retrieved from memory by the activation of the switch means 19 by the control means 8.

Regardless of whether the sampled signal $V_1$ has been stored in the speech memory or whether it has bypassed that memory along lead line 20, after passing the switching means 19, the signals $V_1$ are applied to the facility interface circuit 5 through a latch 21. The facility interface circuit 5 comprises a switching network 26. The network 26 switches the coded voice signals $V_1$ to the available facility 11. However, in accordance with an important aspect of the present invention, the signals $V_1$ are first reconstituted by a plurality of digital-to-analog converters 28, one for each facility 11. The outputs of these converters are a reconstituted signal $V_0'$ which is a facsimile of the original signal $V_0$. The reconstituted signals $V_0'$ are then transmitted in analog form to a receiving circuit and this analog transmission is advantageous because analog signals allow for the economical use of the transmitting bandwidth.

The control means 8 is provided with a clock means for registering the time interval between the arrival from a particular one of said input lines of each successive signal $V_1$ at the speech buffer 22. The control means then retrieves the stored signals in the chronological order of their time of arrival at the buffer 22. Subsequently stored signals are retrieved later than earlier stored signals by an interval equal to the interval between their arrivals. In this manner signals are retrieved from buffer 22 without appreciable distortion of the sequence and duration of the talk burst.

In accordance with another important aspect of the present invention, the aforementioned bypassing means, which is comprised of the switch means 18 and 19 and the lead line or bypass path 20, is advantageous in that not all incoming signals need be stored in the speech buffer 22. If the incoming coded voice signals $V_1$ from a particular input line 1, 2 ... N arrive at switch means 18 and the control means 8 determines that a transmission line 11 is immediately available, that signal may possibly bypass the speech buffer 22. However, before that signal may bypass the speech buffer 22, the control means 8 must first determine whether any previously occurring voice signals $V_1$ are present in the speech buffer 22. If this were not accomplished, it would be possible that coded voice signals $V_1$ could be transmitted in an incorrect time sequence. Thus, all incoming signals from a particular input line are directed to the speech buffer 22 unless there is both an available transmission channel 11 and no previously stored, encoded voice signals $V_1$ from that line are present in the speech buffer 22.

Control module 8 keeps track of all talk bursts on each input channel so that overlapping talk bursts from an input channel are not produced on two output facilities. As an example of this overlap, a first talk burst from input line 1 may be stored in buffer 22 awaiting an available facility. When a second talk burst on this input channel occurs, two facilities may be available so that the second burst conceivably could be transmitted simultaneously with the first talk burst. This overlapping talk burst problem is obviated because control module 8 does not provide a facility to a given input channel until any speech from that channel which has been stored in speech buffer 22 is completely sent out over a facility channel. Thus, the second talk burst is always sent out sequentially after the preceding talk burst on that input channel.

Referring now to FIG. 3, one particular embodiment of a fixed delay means 17 and of the variable delay speech buffer 22 will be described in detail.

In the embodiment shown in FIG. 3, incoming sampled speech signals $V_1$ from a particular input channel 1-N, are applied in a serial format to a highspeed buffer 15. These sampled signals, $V_1$, are then retrieved from the buffer 15 and applied in a parallel format to a random access digital memory, or RAM 200. Rather than employing a separate fixed and variable buffer, the most economic mode of practicing the present invention is to use a single random access digital memory which provides both a fixed buffer in a fixed portion 170 and a variable buffer in a variable portion 220 in that memory as more fully described in the aforementioned Clingenpeel application. However, it is within the scope of this invention to provide separate, fixed and variable delays as suggested in FIG. 2. It is also within the scope of this invention to sample the input signals and store analog samples in an analog memory, such as a delay line or charge-coupled device.

In the event that one of the facilities 11 is available and no previously occurring sampled signals $V_1$ from a particular input channel are stored in the variable portion 220 of the RAM 200, the sampled signal $V_1$ stored in the fixed delay portion 170 of the RAM from that input channel is transferred as parallel 8 bits to a latch 21. Further, the most recent sampled signal $V_1$ is transferred from the buffer 15 to the fixed delay portion 170 of the RAM 200.

However, if one of the facilities 11 is available and previously occurring sampled signals $V_1$ are stored in the variable portion 220 of the RAM 200, the oldest stored sampled signal $V_1$ is transferred to the latch 21 from the variable portion 220. Further, the last sampled signal $V_1$ to enter the fixed portion 170 of the RAM 200 from that channel is transferred to the variable portion 220. In order to transfer from the fixed to the variable portions of the RAM 200 the contents of the fixed portion 170 of the ram 200 are emptied to a highspeed buffer 230 where they are readdressed and rewritten into the variable portion 220. Further, the most recently generated sampled signal $V_1$ is transferred from the buffer 15 to the fixed portion 170 of the RAM 200.

In the event that no facility is available, the sampled signal $V_1$ stored in the fixed portion 170 of the RAM 200 is transferred to the variable portion 220 through the highspeed memory 230. In the unlikely event that no facility 11 becomes available before the variable memory 220 is filled to capacity, memory will be overwritten which will cause speech to be lost.

The timing of the operations defined in connection with FIG. 3 will be more fully understood by reference to FIGS. 4A and 4B. For the purpose of the discussion of FIG. 4A, it should be assumed that N=31, i.e., that there are 31 separate input channels. If each of the input channels is polled, for example, once every 125 microseconds by the multiplexer 13, data from a different input channel arrives at the RAM 200 at approximately once every four microseconds (125 microseconds divided by 31 input channels). This four microsecond time frame during which a particular one of the input lines is polled is further subdivided into eight subintervals, i.e., $a_0$, $a_1$, $b_0$, $b_1$, $c_0$, $c_1$, $d_0$ and $d_1$, as shown in FIG. 4B, each subinterval being approximately 0.5 microseconds.

During subintervals $a_0$ and $a_1$, if a facility 11 is available and if no sampled signals $V_1$ from the particular channel being polled (such as input channel 3 as shown in FIG. 4A) are stored in the variable portion 220 of the RAM 200, sampled signals $V_1$ from that channel are transferred from the fixed portion 170 of the RAM 200 to the latch 21. Further, during these subintervals, the most recently occurring sampled signal $V_1$ from the input channel being polled is transferred from the buffer 15 to the fixed portion 170 of the RAM 200.

During the subinterval $b_0$ and $b_1$, if sampled signals $V_1$ from the particular channel being polled are stored in the variable portion 220 of the RAM 200 and if a facility 11 is now available, the oldest sampled signal $V_1$ is transferred from the variable portion 220 to the latch 21. Also, during these subintervals $b_0$ and $b_1$, the a sampled signal $V_1$ which has been stored in the fixed portion 170 of the RAM 200 is transferred to the variable portion 220 through the highspeed memory 230. Also, during this time interval the most recently occurring sampled speech signal $V_1$ is transferred from the buffer 15 to the fixed portion 170 of the RAM 200.

Finally, during subinterval $B_1$, whatever sampled signal $V_1$ is present at latch 21 is transferred to an output facility 11.

The remaining subintervals $C_0$, $C_1$, $D_0$ and $D_1$ are used by the control module 16 for carrying out the above decision making process. The various decisions made by the control module 16 may be more clearly seen by reference to the flow chart of FIG. 5. As shown in FIG. 5 the control means 8, after a sampled voice signal $V_1$ from a particular input channel has been collected, reads the most previously occurring sampled signal $V_1$ from that channel which has been stored in the fixed portion 170 of the RAM 200 and writes the current signal into that same address. As illustrated by the block 310 the control means 8 then determines if an output facility 11 has been assigned to that input channel. If a facility has been assigned, sampled signal $V_1$ which has been stored the longest is transferred to the latch 21. However, if a facility 11 has not been assigned, the control module 8 determines whether the user of the particular input channel in question is speaking. This is illustrated by decision block 312. If the input line is not speaking, the control module determines whether the channel is assigned a variable buffer in decision block 314A. If not, the control advances to poll the next channel. If this is yes, the control advances to decision block 318, as described later. If the input channel has speech, the control module 8 determines whether space in the variable portion 220 of the RAM 200 has been assigned to that input channel. This is illustrated by decision block 314B. If space has not been assigned, it is provided. However, if space previously has been assigned, the control module 8 determines whether that space is expanding. In other words, the control module determines whether the buffer assigned channel X has been given a facility, in which case it is no longer expanding. This is illustrated by the decision block 316. If the speaker has reached a pause in his conversation, as determined by decision block 312 above, the control module 8 determines whether the speaker's silent period is longer than the time required to have read out the stored speech from that speaker. This is illustrated by decision block 318. Therefore, the implementation of the decision block 318 eliminates the aforementioned overlapping speech burst problem.

In the event the control module 16 determines that the assigned buffer is expanding, i.e., that there is no facility assigned to the buffer, the control module determines whether more space is available in the variable portion 220 of the RAM 200. This is illustrated by decision block 320. If space is available in the variable portion 220, the most recently occurring stored sampled speech signal $V_1$ is transferred from the fixed portion 170 to the variable portion 220 of the RAM 200.

The information stored in the fixed or variable portions of the RAM 200 is advanced to the latch 21 where it is transmitted, in turn, to the receiver portion of the present invention.

Referring now to FIG. 6, the receiver portion of the present invention is shown generally at 30. The receiver portion 30 provides a means for receiving the reconstituted signals $V_0'$ which have been transmitted across the facility 11.

The receiver portion 30 comprises a plurality of sampling means 32 such as the analog-to-digital converters as shown. The sampling means 32 preferably provides a re-encoded voice signal $V_1'$ which is a digital representation of the reconstituted voice signal $V_0'$. The re-encoded signal $V_1'$ is then applied to another fixed time delay means 34 such as a fixed receive buffer memory as shown. The delayed, re-encoded signal $V_1'$ is then applied by a second control means 36 to selected ones of a plurality of output channels 38 through a plurality of reconstituting means 40. The means 40 are comprised of digital-to-analog converters as shown. The output of reconstituting means 40 comprises a facsimile of the original voice signal $V_0$ which has been applied to the input channels 1, 2 ... N and these signals are applied to the output channels 38 and directed to the appropriate telephone subscribers.

Control means 36 responds to the control message to connect the facility channel to the proper output channel 38.

Other embodiments and modifications fall within the true spirit and scope of the invention as set forth in the appended claims.

What is claimed is:

1. A communication system of the type having a means for dispatching original signals from a plurality of input channels through switching means to a lesser plurality of transmission facilities connected to a remote location, said system comprising:
   a speech detector coupled to each input channel for detecting the presence of said signals on that channel;
   means for sampling the detected signals from each of said input channels;
   a variable length speech buffer for temporarily storing the sampled signals if a facility is unavailable until one such facility is available;
   control means responsive to said speech detector for assigning the sampled speech signals from each input channel to available transmission facilities through said switching means, for assigning said signals to said buffer if no facility is available and for sequentially retrieving said sampled signals from said buffer when a facility becomes available; and
   means coupled between said switching means and said facilities for producing reconstituted voice signals from said sampled signals, the reconstituted signals being connected to one of said facilities.

2. The communication system of claim 1 further comprising:
   means responsive to said control means for bypassing sampled signals emanating from a particular input channel around said speech buffer whenever both a facility is available and no sampled signals from said channel are stored in said memory.

3. The communication system of claim 2 wherein said bypassing means comprises a pair of interconnected switching means.

4. The communication system of claim 3 wherein said pair of interconnected switching means are controlled by said control means.

5. The communication system of claim 1 wherein said variable length buffer is active sufficiently long after the encoded speech signal is transmitted to the facility to prevent overlap of talkbursts.

6. The communication system of claim 1 wherein said control means further comprises a clock means for registering the time interval between the arrival from a particular one of said input channels of each successive encoded signal at said speech buffer.

7. The communication system of claim 6 wherein said control means further comprises a means for retrieving the stored sampled voice signals in the chronological order of their time of arrival at said buffer, subsequently stored signals being retrieved later than said earlier stored signals.

8. The communication system of claim 1 wherein said means for sampling comprises an analog-to-digital converter.

9. The communication system of claim 1 wherein said means for producing a reconstituted voice signal comprises a digital-to-analog converter.

10. The communication system of claim 1 further comprising:
   means for receiving said first reconstituted voice signals from each of said facilities, said receiving means comprising:
   means for digitally re-encoding said first reconstituted voice signals;
   a second control means for selectively routing said first reconstituted voice signals toward selected ones of a plurality of output lines; and
   means for reconstituting said original from said re-encoded signals on output channels.

11. The communications system of claim 10 wherein said receiving means further comprises a fixed length buffer for storing said re-encoded signals until said routing is completed.

12. A communication system of the type having a means for dispatching signals from a plurality of input channels through switching means to a lesser plurality of transmission facilities directed to a remote location, said system comprising:
   a speech detector coupled to each input channel for detecting the presence of said voice signals on that channel;
   means for sampling said detected voice signals from each of said input channels;
   a speech buffer for temporarily storing said encoded voice signals if a facility is unavailable until one of said facilities is available;
   control means responsive to said speech detector for assigning said sampled signals to available facilities through said switching means and coupled to said speech buffer for assigning said signals to said buffer if a facility is unavailable and for sequentially retrieving said stored, sampled signals when a facility becomes available; and
   means for bypassing said sampled signals from a particular input channel around said buffer whenever both a facility is available and no sampled signals from that channel are stored in said buffer.

13. The communication system of claim 12 wherein said control means further comprises a clock means for registering the time interval between the time of arrival from a particular one of said input channels of each successive sampled signal at said first speech memory.

14. The communication system of claim 12 wherein said control means further comprises a means for retrieving said stored encoded voice signals from a particular input channel in the chronological order of their time of arrival at said buffer, subsequently stored signals being retrieved later than said earlier stored signals by intervals determined only by real facility availability.

15. The communication system of claim 14 wherein encoded voice signals from a particular input channel are stored until a facility channel is available and until all previously occurring stored encoded signals from that channel have been retrieved.

16. The communication system of claim 12 wherein said bypassing means comprises a pair of interconnected time division and space switching means.

17. The communication system of claim 16 wherein said switching means are activated by said control means.

* * * * *

UNITED STATES PATENT AND TRADEMARK OFFICE
CERTIFICATE OF CORRECTION

PATENT NO. : 4,153,816
DATED : May 8, 1979
INVENTOR(S) : William A. Morgan

It is certified that error appears in the above—identified patent and that said Letters Patent are hereby corrected as shown below:

Col. 2, Line 39, delete "disclosure" and substitute therefor --disclosures--.

Col. 4, Line 60, after "coded" insert therefor --voice--.

Col. 7, Line 14, delete "these".

Col. 7, Line 14, delete "a".

*Signed and Sealed this*

*Fourteenth* Day of *August 1979*

[SEAL]

*Attest:*

LUTRELLE F. PARKER
*Attesting Officer*   *Acting Commissioner of Patents and Trademarks*